Oct. 6, 1970            F. O. WIENERT            3,532,489
METHOD AND APPARATUS FOR REDUCING METAL OXIDES
Filed June 3, 1966            2 Sheets-Sheet 1
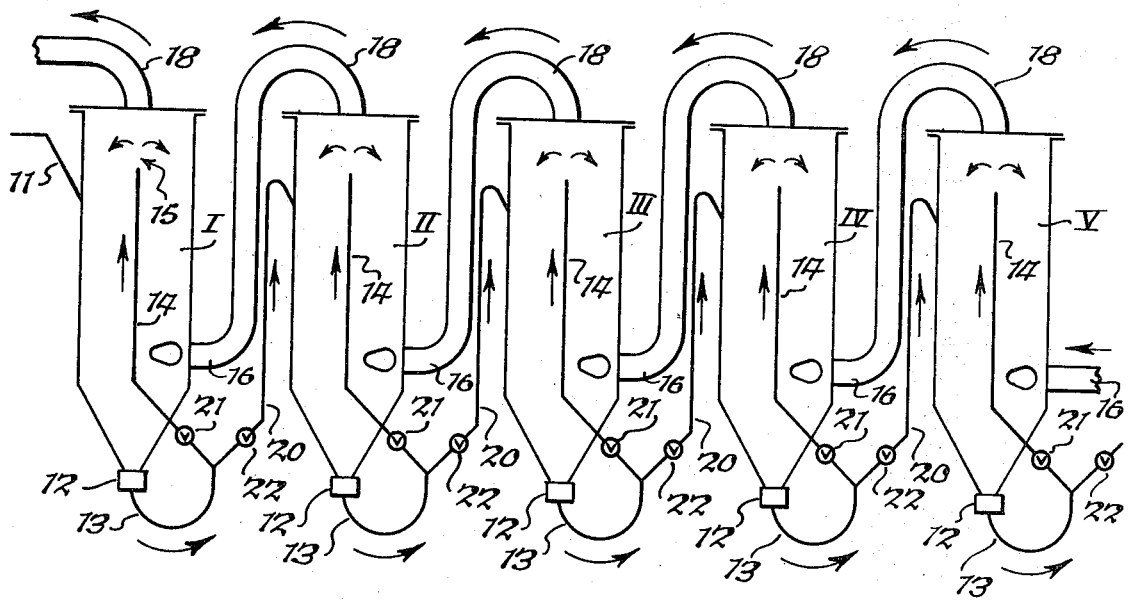
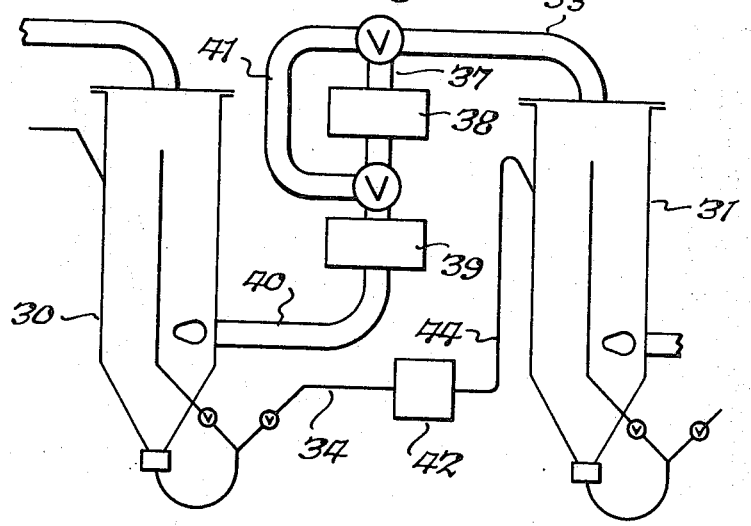
INVENTOR.
Fritz O. Wienert
BY
Ashlan F. Harlan Jr.
ATTORNEY.

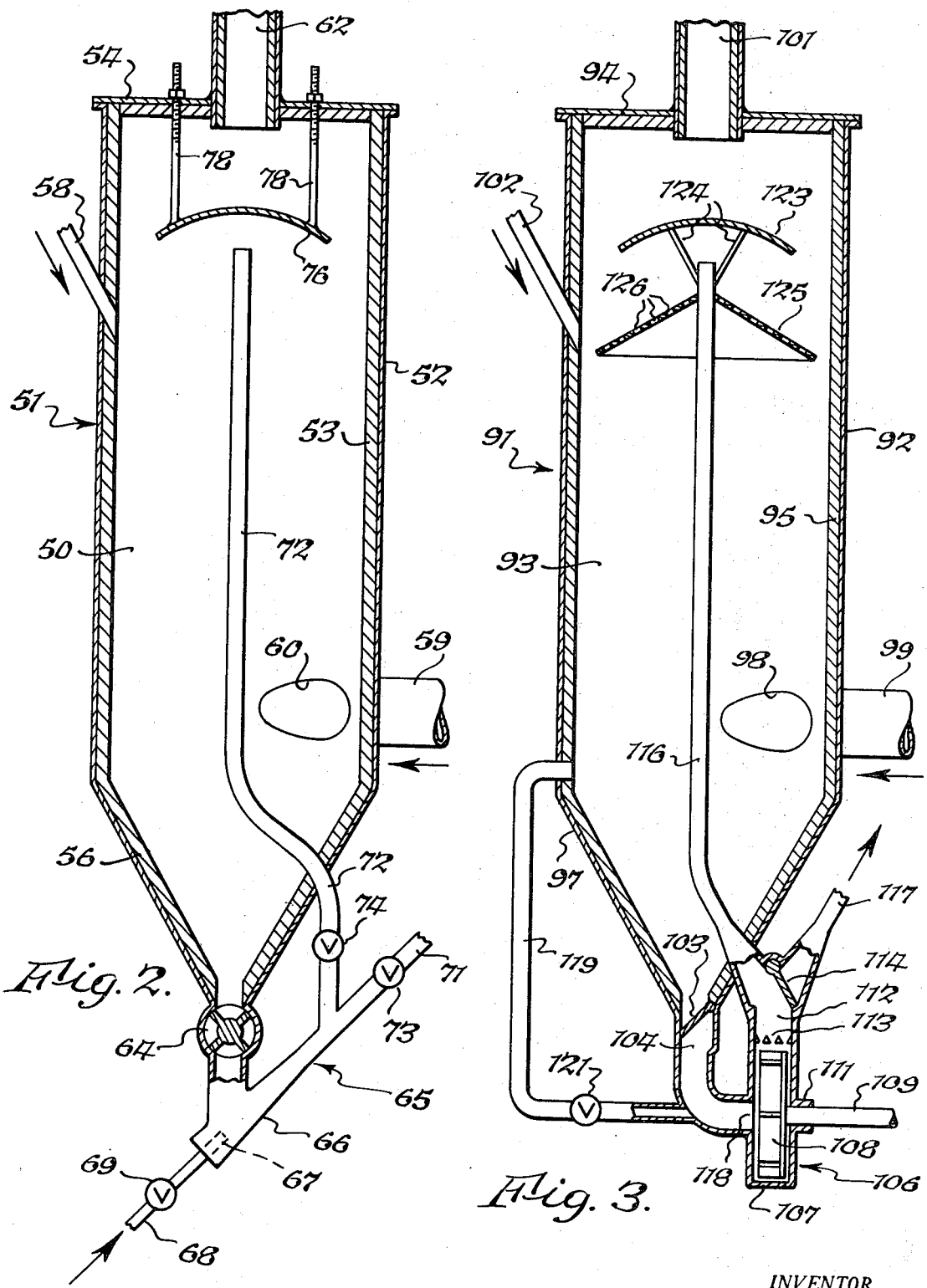

United States Patent Office 3,532,489
Patented Oct. 6, 1970

3,532,489
METHOD AND APPARATUS FOR
REDUCING METAL OXIDES
Fritz O. Wienert, Lewiston, N.Y.
(394 Roosevelt Ave., Niagara Falls, N.Y. 14304)
Filed June 3, 1966, Ser. No. 555,089
Int. Cl. B22f 9/00; C21b 11/00, 13/14
U.S. Cl. 75—.5
9 Claims

ABSTRACT OF THE DISCLOSURE

A counter-current process is disclosed for the gaseous reduction of very small metal oxide particles to the finely divided elemental metal, not involving fluidized bed reduction. Oxide particles smaller than 75 microns are dispersed in a hot reducing gas in several connected chambers and moved in a direction opposite the gas. Optionally, all or a portion of the particles may be redispersed and recirculated in a chamber before passing to a succeeding chamber.

---

This invention relates to a method and apparatus for reducing metal oxides. More particularly, this invention relates to a method for reducing metal oxides such as, for example, as iron oxide by moving the finely divided oxide particles counter to the flow of a reducing gas through a series of reducing steps.

There are a number of known methods for reducing a metal oxide, either a natural ore or an artificial oxide, to sponge metal without melting the metal oxide. Substantially all of these methods involve exposing the oxide to a reducing gas at relatively high temperatures whereby the oxide is eventually reduced to the metal. For instance, in reducing iron oxide, a reducing gas essentially comprising carbon monoxide and/or hydrogen is allowed to flow through a stationary bed of relatively large ore pieces or pellets of iron oxide. This process is time consuming because the reducing gas as well as the carbon dioxide and water vapor produced by the reduction reaction diffuse rather slowly into and out of the rather large oxide bodies composing the bed. Moreover, the iron oxide is reduced non-uniformly since, because of channeling in the bed, the gas flow therethrough is uneven.

In another process, a bed of ore pieces or pellets of metal oxide is agitated and heated while passing through a rotary kiln. The reducing atmosphere is provided by carbon monoxide produced by the partial oxidation of particulate carbon dispersed in the bed. Here again the capacity of the equipment is seriously limited because of the slow diffusion of the gases into and out of relatively large ore pieces or pellets. Moreover, such a process is inefficient because the reducing gas utilization is poor.

To overcome some of the problems associated with the above-described processes, the fluidized bed process was developed. In this process a heated reducing gas is introduced into a bed of finely divided metal oxide at such a velocity and flow rate that it passes through the metal oxide bed and acts as a support or vehicle for lifting and agitating the particles of metal oxide. The particles are moved within and through the reaction zones while being supported in the gas as though they were fluid. Although theoretically such a process would appear to offer a solution to the above-mentioned problems of a slow and non-uniform reduction, as a practical matter it is very difficult to control.

For instance, the size distribution of the particles of metal oxide is critical in order to achieve proper fluidization. However, relatively coarse metal oxide particles, which are necessary to achieve fluidization, are still poorly reduced since the reducing gas cannot completely and quickly penetrate them. On the other hand, particles which are fine and thus more easily reduced by the gas tend to be entrapped in and carried out with the spent gas. To further add to the difficulties encountered when using fluidized bed processes, incompletely reduced particles tend to form heavy agglomerates which settle and eventually stop fluidization. The utilization of the reducing gas is poor since gas velocity must necessarily be high to suspend the metal oxide particles and consequently the contact time between the particles and reducing gas is relatively short. Attempts to improve reducing gas utilization in fluidized bed processes by moving the solids through a series of beds fluidized by gases of varying composition have not proved commercially attractive since the above-mentioned problems associated with a single fluidized bed have simply been multiplied by the number of beds in the process.

It has been found that the problems associated with the afore-mentioned reducing processes are eliminated when, according to this invention, hot, finely divided particles comprised essentially of iron oxide are introduced at the beginning of a series of reducing steps and leave, after the desired reduction, at the end of said series whereas suitable hot reducing gases are introduced at the end of said series and leave as spent gases at the beginning of said series, each reducing step comprising dispersing hot, finely divided particles in hot reducing gas and separating said particles and gas, and moving said particles and gas in counter-direction through said series. In such stepwise counter-movement, all of the fine particles progressing through the series of reducing steps are in uniform contact with gas having progressively greater reducing power. In consequence, the reduction is uniform, the desired degree of reduction is easily accomplished, and the spent gas has practically exhausted its reducing power at the end of the series of steps.

The reducing gas used in this invention preferably consists essentially of carbon monoxide and/or hydrogen and may be made by well known methods. In reducing iron oxide, for example, the reducing gas preferably contains both hydrogen and carbon monoxide and may be prepared by the reaction at elevated temperatures of natural gas (mainly methane) or other hydrocarbon up to and including heavy and crude oil with carbon dioxide and/or steam. The reaction of a hydrocarbon with carbon dioxide results in a gas rich with carbon monoxide whereas a reaction with steam favors a hydrogen-rich reducing gas as illustrated by equations (a) and (b) respectively:

(a) $CH_4 + CO_2 = 2CO + 2H_2$
(b) $CH_4 + H_2O = CO + 3H_2$

For economy and efficiency of operation, the hydrocarbons may be reacted with some of the spent gas from the process to form regenerated reducing gas. It should be noted, however, that the reducing gas may be prepared by other methods such as by burning carbon or hydrocarbons with a deficiency of oxygen.

The particle size of the oxide to be reduced is of importance since particle size governs the capacity of the equipment and the degree of utilization of the reducing gas. Thus, a coarse-grained oxide will require more recirculation in one reducing step and/or a greater number of such steps according to this invention than a fine-grained oxide, since the coarse particles must be exposed to the gas for a longer period of time in order to effect substantially complete reduction of the oxide therein. Accordingly, significant percentages of particles larger than about 200 microns should be avoided. In reducing ferric oxide by the present process, it is preferred that it have a particle size of less than about 75 microns and when reducing natural mganetite it is advantageous to use particles smaller than about 40 microns.

Preferably, in the reduction of metal oxides according to this invention, the finely divided oxide is dispersed in a counter-current, upwardly moving column of hot reducing gas. In this manner the oxide particles are all brought into contact with the reducing gas and efficient utilization of the gas is achieved. This step is repeated in each of a series of reduction chambers, the passage of the oxide particles through each successive chamber resulting in further reduction thereof until they are practically completely reduced to metal. To obtain the most efficient use of the reducing gas and insure the maximum degree of reduction, it is preferred to recirculate at least a portion of the particles in each of said reduction chambers before they pass to the succeeding chamber. Although, when carrying out this invention using a series of reduction chambers, fresh reducing gas may be used in each chamber, it is preferred, since the reducing power of the gas is only partially utilized in a single chamber, to provide interconnections for flow of reducing gas between the chambers in overall counter-current movement with respect to the oxide particles.

The metal oxide particles are introduced into the first reduction chamber in the series and are there partially reduced, then collected, and moved to the next reduction chamber. This procedure is repeated until the particles reach the last reduction chamber, the movement of the metal oxide being counter to the gas flow. It can be seen, therefore, that the oxide particles are in contact in successive steps with successively richer reducing gas until at the last reducing step the particles are dispersed in and settle through freshly generated reducing gas.

The reducing gas is introduced in the process in a heated condition and the gas temperature should be as high as practically possible to allow for heat loss by conduction through the walls of the apparatus and by consumption in endothermic reactions such as that of iron oxide with hydrogen. This reduction reaction is favored at temperatures higher than about 700° C. over the reduction of iron oxide by carbon monoxide. Therefore, the reducing gas is preferably introduced into the system at a temperature between about 900° C. and 1000° C. Although higher temperatures may be used, they are not usually feasible because of the heat resistance limitations of the materials used in constructing the reduction chambers and allied equipment contacted by the hot reactants. At temperatures below about 750° C. the rate of reduction of the metal oxide by the hydrogen of the reducing gas is relatively slow. On the other hand, at temperatures below 700° C. the exothermic reduction of the metal oxide by carbon monoxide is favored. Thus in carrying out the stepwise reduction of iron oxide according to this invention, the reducing gas enters the system at temperatures well above 700° C. and is maintained for at least one reducing step above that temperature. Further the gas may be used for at least one reducing step at temperatures below 700° C. in the range where the exothermic reduction of the metal oxide by carbon monoxide is favored. In this manner, the reducing power of both the hydrogen and carbon monoxide of the reducing gas is effectively utilized.

In the above connection, it is preferred that the metal oxide be preheated to temperatures ranging from about 300° C. to about 700° C. before entering the system so that conditions for reduction of the metal oxide by carbon monoxide are favored. The number of reducing steps and reduction chambers used in this invention may be varied depending on factors including: The character of the metal oxide, its particle size, the type of reducing gas used, and the contact time of the particles in the reducing gas. It is evident that the contact time, i.e. time of settling of the particles in the rising reducing gas columns, can be controlled by varying the volume of the gas entering the reduction chambers and by the dimensions of such chambers.

Referring now to the drawings:

FIG. 1 is a schematic view of apparatus comprising a number of reduction chambers of a type suitable for carrying out the novel process of the present invention connected in series;

FIG. 2 is a sectional view, largely schematic, of one type of reduction chamber;

FIG. 3 is a sectional view, largely schematic, of another type of reduction chamber; and FIG. 4 is a diagrammatic view showing two reduction chambers connected in series and having means therebetween for treating the reducing gas and heating the metal oxide.

The reduction of metal oxide particles according to this invention may be carried out, as illustrated in FIG. 1, in a series of reduction chambers designated as I, II, III, IV, and V, respectively. Although five chambers are shown, the number may be varied according to the process conditions desired and encountered. The finely divided metal oxide particles are introduced into reduction chamber I through pipe 11. Any suitable and desired means (not shown) may be provided for supplying the hot oxide particles to the pipe 11. The particles are collected at the bottom of the chamber, which is preferably conical, and pass therefrom to transport means 12. By the latter the oxide particles are forced through the line 13 and may be fed through the upright pipe 14 to a point 15 adjacent the top of the chamber I where they are ejected and dispersed in the hot reducing gas introduced into the chamber through the pipe 16. As the oxide particles descend through the hot reducing gas, partial reduction occurs and by recirculation of the particles through the transport means 12, line 13, and pipe 14, further reduction can be accomplished. The reducing gas is exhausted from the chamber I through the outlet line 18.

It is very important to the present invention to carry out the reduction of the metal oxide in a plurality of reduction chambers since greatly improved reduction efficiency can thus be attained. Accordingly, a pipe or conduit 20 is provided which is also connected to the line 13 and leads therefrom to the reduction chamber II at a point adjacent the upper end thereof. Suitable means such as valves 21 and 22 in the pipes 14 and 20, respectively, is provided in conjunction with the line 13 for adjustably controlling the relative flow of the oxide particles withdrawn from reducing chamber I through line 13 to reducing chamber II and through the pipe 14 to recirculation in chamber I.

The partially reduced oxide particles are, as indicated above, subjected to further reducing treatment by circulating them through reduction chambers II–V in the same manner as described above in connection with chamber I. The step-wise reduction is carried on substantially continuously until the practically completely reduced particles descending through the reducing gas stream in chamber V are removed from the system. As a result of the preferred recirculation, there is little chance of relatively large oxide particles passing through the system without substantial reduction.

It will be understood, as hereinafter explained in more detail, that the several reduction chambers I–V, inclusive, are preferably similar in construction and in general substantially identical in operation. Connections are provided between the chambers whereby partially reduced oxide particles pass through the series of chambers from I to V while reducing gases are introduced into chamber V through pipe 16 from a suitable generator (not shown) and pass successively through the several chambers to be exhausted from chamber I through pipe 18.

As was mentioned above, the reducing effectiveness of the gas employed may be lowered due to a substantial drop of the reducing gas temperature during the process. This drop is attributed both to heat consumption by the endothermic reaction between the hydrogen of the reducing gas and the metal oxide and to heat lost by conduction through the apparatus walls. Furthermore, as the metal oxide is reduced, there is a build-up of H₂O in the gas which also lowers the reducing power of the gas.

It is within the scope of this invention to provide means intermediate some or all of the reduction chambers for heating the gas and for removing moisture therefrom, if desired. Referring to FIG. 4, reduction chambers 30 and 31, which may be constructed like any of the chambers illustrated, are shown connected in part by line 33 and pipe 34. Reducing gas leaving reduction chamber 31 by line 33 may pass, by line 37, to suitable means 38 for removing moisture from the gas. Any conventional and/or desired means may be employed for this purpose. For example, the means 38 may comprise one or more cooling coils for condensing the water vapor in the gas or may comprise a column packed with a moisture absorbent material. From the moisture removing means 38, the gas passes through suitable heating means 39, which also may be conventional and by which it may be heated to the desired temperature, and then through line 40 to the gas inlet of the chamber 30. Preferably, a by-pass 41 is provided around the moisture removing means 38 so that passage of the reducing gas therethrough can be avoided if desired. It will be apparent that if desired or necessary suitable means, such as a fan (not shown), may also be provided between adjacent reduction chambers to aid passage of the gas through the system.

It may also be desired to reheat the partially reduced metal oxide particles as they move between reduction chambers. This may be accomplished by a reheater 42 of any suitable and desired type. The reheater 42 receives partially reduced oxide from the chamber 30 through pipe 34 and the reheated particles continue their passage to the chamber 31 through the pipe 44.

It will be appreciated that since the present reduction process operates at elevated temperatures, the prevention of heat losses in the system is important. Accordingly, it will generally be desirable to use all feasible means to insulate the apparatus and the connections therebetween. In FIGS. 2 and 3, the use of insulating refractory material is indicated in some areas, but this is not to be construed as an indication that suitable insulation should not be used elsewhere. Also, of course, it will be evident to those skilled in the art that materials should be used for the apparatus and connections which are resistant to the reactants and possess adequate strength at the temperatures employed.

FIG. 2 shows in detail, though schematically and not to scale, one embodiment of a reduction chamber suitable for the accomplishing the step-wise reduction of metal oxide particles according to this invention in conjunction with other reducing chambers which may be similar or identical. The reduction chamber 50 is provided within a casing, generally designated by the numeral 51, which comprises a body shell 52, that may conveniently be constructed of steel, having a suitable refractory insulating lining 53 and an insulated cover 54 secured to the body shell by any suitable means (not shown). The upper and major portion of the shell 52 is preferably cylindrical in cross-section and the lower portion 56 is conical for convenient collection of the particles introduced into the chamber 50 near the top thereof through the inlet pipe 58. Hot reducing gas flows through line 59 from the preceding chamber, for example, and enters chamber 50 tangentially through the opening 60 located in the lower portion of the cylindrical shell portion. Within the chamber 50 the reducing gas rises with a spiral movement to the central gas outlet 62 provided in casing cover 54. The gas exhausted through the outlet 62 may, for example, pass to another reduction chamber or, if there is none, may be disposed of, for example, by use in generating fresh reducing gas or by burning for heating purposes.

As mentioned above, the fine particles of metal oxide, all or a portion of which may have been partially reduced in a previous step, that are introduced into the reduction chamber 50 through the inlet pipe 58 collect in the conical lower portion of the chamber. From there they are fed by the rotatable feed valve 64 to the transport means 65. In this embodiment such transport means comprises a tapered casing 66 having an axial, internal nozzle 67 to which a source of non-oxidizing, preferably heated gas is supplied through a line 68 provided with a regulating valve 69.

The particles entering the casing 66, from feed valve 64, through the side thereof are pneumatically transported into one or the other or both of lines 71 and 72 which are provided respectively with valves 73 and 74. The line 71 may extend to an adjacent reduction chamber or, if there is none, to suitable collection facilities. The line 72 extends through the casing 51 and projects upwardly, axially, and preferably centrally, within the chamber 50 to a point adjacent ther upper end thereof. By adjustment of the valves 73 and 74, a desired portion of the particles passing through the transport means 65 may be conveyed through the pipe or line 72 and projected at the upper end thereof against a curved baffle 76. The baffle 76 which is preferably formed of suitable heat-resistant material is adjustably suspended by suitable means such as threaded studs 77 from the central casing cover 54. The fine oxide particles are freely dispersed through the cross section of the interior of reduction chamber 50 by the baffle 76 and the dispersed particles are partially reduced as they descend through the spirally rising column of reducing gas, to be again collected in the conical bottom portion of the chamber.

A portion of the particles may be subjected to repeated treatment by recirculating them through reduction chamber 50, along with fresh particles, in the manner described above, or they may be removed through line 71 for treatment in another reduction chamber. If the chamber 50 is the last reduction chamber in a series as described in connection with FIG. 1, the practically completely reduced particles may be removed through line 71 to suitable collection means (not shown).

In FIG. 3 there is illustrated schematically an alternative form of apparatus providing a reduction chamber which may be used in carrying out the step-wise, counter-move reduction process according to this invention.

This apparatus, which in major respects is very similar to the apparatus illustrated in FIG. 2, comprises a casing, comprehensively indicated by the reference numeral 91, which comprises a body shell 92 within which is the reduction chamber 93. An insulated lid or cover 94 is provided for the body shell 92 and is secured thereto by any suitable means (not shown) such as clamps or bolts. A refractory, insulating lining 95 of suitable material such as a porous ceramic is provided for the shell 92. As with the casing 51, the upper and major portion of the shell 92 is preferably cylindrical in cross-section and the lower portion 97 thereof is conical.

Hot reducing gas flows into the chamber 93 tangentially through the port 98 from the feed line or duct 99 and rises with a spiral movement through the chamber to the top thereof where it is exhausted through the outlet pipe 101 provided in the cover 94. As in FIG. 2, the hot particles of metal oxide or partially reduced metal oxide are introduced into the chamber 93 adjacent the upper end thereof through a pipe or line 102 and fall downwardly into the conical bottom portion of the chamber. A valve or gate 103 is provided to regulate flow of the particles collected in the conical portion of the chamber 93 into the discharge pipe 104 by which they are fed to transport means functionally similar to that described above in FIG. 2 and comprehensively designated 106.

Transport means 106 comprises an impeller casing 107 in which the impeller rotor 108 is rototably mounted as, for example, by the axial drive shaft 109 being journaled in a bearing formed in the boss 111. Extending radially from the casing 107 is the outlet 112 from the transport means, a grate 113 being provided therein for breaking up aggregates. The outlet 112 leads to a diversion valve or gate 114 adapted to selectively open a path for the oxide particles to a pipe 116 or a pipe 117, or to proportion flow between them. The particles pass through the pipe 116 back into the chamber 93 and pass through the pipe 117 to the next chamber in the series or, when at the end of the series, to suitable collecting means (not shown).

The operation of the embodiment illustrated in FIG. 3 is very similar to that of the embodiment of FIG. 2. Metal oxide, which, if the chamber 93 is not the first of a series like that shown in FIG. 1, has been partially reduced, is fed to the chamber 93 through the pipe 102 and settles into the conical bottom portion 97 of the chamber. When the valve 103 is opened, the fine particles of oxide or partially reduced oxide pass through line 104 to the axial inlet 118 of the impeller casing 107. Flow of the particles is facilitated by supplying gas from the interior of the chamber 93 through by-pass line 119 to a point in the line 104 adjacent the impeller inlet 118, the flow of gas being controllable by means of a valve 121. The setting of the valve or gate 114 determines the proportion of the particles leaving the impeller casing 107 which are returned to the chamber for further reduction or proceed to a subsequent step. In the case of the former, the particles pass upwardly through the pipe 116 to a point adjacent the upper end of the chamber 93 and are there discharged against a deflector 123 which directs the particles outwardly and downwardly. The deflector 123 is preferably circular and is supported in concentric relation to the shell 92 by struts 124 suitably secured to the pipe 116. Below the deflector 123 and also secured by suitable means on the pipe 116 concentrically with the shell 92 is a conical distributor 125 having holes 126 therein. Thus the particles directed downwardly by the deflector 123 are substantially evenly distributed over most of the cross-sectional area of the chamber as they fall through the hot reducing gas. The particles collecting in the conical lower portion of the chamber 93 may be recirculated in the manner described or passed on through pipe 117 depending upon the setting of the diversion valve 114.

In the following examples the operation of a system such as illustrated in FIG. 1 is described in conjunction with the reduction of specific metal oxides.

EXAMPLE I

As a reducing gas mixture there is employed the gaseous product obtained by cracking a fuel oil, the mixture containing approximately 68.2 vol. percent CO and 31.8 vol. percent $H_2$. The oxide for reduction is a Brazilian hematite ore containing 96% $Fe_2O_3$ which is ground to such fineness that 95% passes through a 325 mesh sieve. The reducing gas and iron oxide are proportioned in the mol ratio of $5(CO,H_2):Fe_2O_3$.

In the first step carried out in, for example, chamber I, the iron oxide is heated to about 450° C. before introduction into the chamber and the gas in which it is dispersed contains considerable carbon dioxide and $H_2O$ resulting from prior reduction steps but retains sufficient carbon monoxide for effective partial reduction. In the course of such reduction the temperature in the chamber will rise to about 650° C. The partially reduced particles entering chamber II from chamber I and being recirculated there encounter a reducing gas atmosphere containing more carbon monoxide and hydrogen and less carbon dioxide and $H_2O$ than in the preceding step. The reduction continues as the partially reduced oxide particles pass successively through chambers III and IV until in the last chamber, V, the particles encounter fresh reducing gas with a relatively high content of hydrogen introduced at a temperature of about 950° C. The practically completely reduced product leaving the system is cooled under a protective atmosphere such as argon and contains an average total iron content of about 93% and an average metallic iron content of about 87%.

EXAMPLE II

In this example the reducing gas mixture, which contains approximately 75 vol. percent $H_2$ and 25 vol. percent CO, is such as can be obtained by cracking methane with steam. The oxidic ore used is a concentrate derived from wet grinding and magnetic beneficiation of a magnetite ore and contains about 92% $Fe_3O_4$. The fineness of the oxide is such that 85% passed through a 400 mesh sieve. A mol ratio of reducing gas to oxide of about $6.67(CO,H_2):1Fe_3O_4$ is employed.

The iron oxide particles heated to about 400° C. are introduced into chamber I and, after recirculation of at least part of the particles, pass to chamber II and subsequently to chambers III, IV, and V with at least some recirculation in each chamber, meeting in each successive chamber an atmosphere containing progressively higher percentages of reducing gases. The reaction is carried on at about 650° C. in chamber II and at about 700° C. in chambers III and IV. In chamber V with the fresh reducing gas the temperature is about 750° C., the partially reduced oxide from chamber IV being heated intermediate the chambers as described above. The product leaving chamber V is cooled by gas subsequently supplied to the system through gas inlet 16 of chamber V and has an average total iron content of about 93% and an average metallic iron content of about 84%.

The products of both of the foregoing examples are well adapted for use either as such or after compacting into briquettes in metallurgical processes requiring feed material with a high metallic iron content.

It will be understood that the design and arrangement of the apparatus illustrated and described permits extensive variation in treatment of the oxide particles in carrying out the reduction process. Merely as examples: although generally it will be desired to achieve about one-fifth of the total reduction in each chamber of a five chamber reduction system, the proportion of partially reduced oxide particles that are recirculated in any one step may be increased to obtain a longer average stay in that chamber so that greater reduction takes place; the reducing gas composition can be changed between steps by addition of modifying gas through suitable connections.

Also to be understood is that the apparatus itself may be altered and modified without departing from the invention. Two embodiments of suitable apparatus for reduction chambers are shown in FIGS. 2 and 3. In most cases the form of FIG. 2 will be preferred for the first three steps while the form of FIG. 3 will be preferred for the fifth step and perhaps for the fourth step. However, structures combining features of both forms may be employed. For example, a distributor like that of FIG. 3 could be used in the device of FIG. 2 and two valves could be used to proportion the flow through pipes 116 and 117 in FIG. 3 instead of a single diversion valve. It will also be recognized that other known apparatus could be used in carrying out the stepwise, countermovement reduction process of this invention, the use of separate mixing and separation units being possible.

Although, as indicated above, the reduction of iron oxide by the above-described process is of primary economic importance, the process can be employed in the reduction of all metal oxides that are reducible by carbon monoxide and/or hydrogen at reasonable temperatures, i.e. from about 100° C. to about 1000° C., but in any case below the melting points of the metal and its oxide. Included in such oxides are those of copper, nickel and molybdenum.

In the foregoing description and the appended claims, percentages and ratios are by weight unless otherwise indicated. Sieves referred to are those of the U.S. Standard Series.

What is claimed is:

1. In a stepwise countercurrent process for producing finely divided metal by reduction of fine particles of an oxide of said metal with reducing gases at an elevated temperature but below the melting point of said metal and its oxide, the improvement which comprises dispersing particles, smaller in size than 75 microns, of such oxide in a large volume of a hot reducing gas in each of a plurality of connected reduction chambers, separating said particles from reducing gas by gravity, and conducting said separated particles and said gas in opposite directions through successive ones of said reduction chambers whereby partial reduction of said oxide particles will take place in successive reduction chambers until said particles are practically completely reduced to metal.

2. A process as set forth in claim 1 in which said particles in at least one of said chambers are caused to settle in dispersed state through a hot reducing gas moving countercurrently thereto.

3. A process as set forth in claim 2 in which in at least one of said reduction chambers at least some of said separated particles are redispersed and recirculated before passing to a succeeding reduction chamber.

4. A process as set forth in claim 3 in which the circulated particles from one reduction chamber are divided, with a portion of said particles being recirculated in said one reduction chamber and the remainder of said particles being conducted to a succeeding reduction chamber.

5. A process as set forth in claim 1 in which said particles are heated between two successive reduction chambers.

6. A process as set forth in claim 1 in which said reducing gas is heated between two successive reduction chambers.

7. A process as set forth in claim 1 in which the $H_2O$ content of said reducing gas is decreased between two successive reduction chambers.

8. A process as set forth in claim 4 in which said particles and said reducing gas are heated between at least two successive reduction chambers and the $H_2O$ content of said reducing gas is decreased between at least two successive reduction chambers.

9. In a stepwise countercurrent process for producing finely divided metal by reduction of fine particles of an oxide of said metal with reducing gases at an elevated temperature but below the melting point of said metal and its oxide, the improvement which comprises dispersing said particles, in each of a plurality of connected reduction chambers, in a current of hot reducing gas the velocity of which is insufficient to establish a fluidized bed with said particles, separating said particles from reducing gas by gravity, and conducting said separated particles and said gas in opposite directions through successive ones of said reduction chambers, whereby partial reduction of said oxide particles will take place in successive reduction chambers until said particles are practically completely reduced to metal.

References Cited

UNITED STATES PATENTS

| | | | |
|---|---|---|---|
| 2,909,424 | 10/1959 | Jukkola | 75—26 |
| 2,973,260 | 2/1961 | Nogiwa | 75—26 |
| 3,020,149 | 2/1962 | Old et al. | 75—26 |
| 3,021,208 | 2/1962 | Feinman | 75—26 |
| 3,076,702 | 2/1963 | Hemminger | 75—26 |

L. DEWAYNE RUTLEDGE, Primary Examiner

W. W. STALLARD, Assistant Examiner

U.S. Cl. X.R.

75—34, 35